A. G. SIMMONS
WATERING TROUGH.
APPLICATION FILED OCT. 5, 1908.

920,781.

Patented May 4, 1909.

WITNESSES

INVENTOR
ARTHUR G. SIMMONS
BY Smith & Frisbie
ATTYS.

UNITED STATES PATENT OFFICE.

ARTHUR G. SIMMONS, OF BOSTON, MASSACHUSETTS.

WATERING-TROUGH.

No. 920,781.  Specification of Letters Patent.  Patented May 4, 1909.

Application filed October 5, 1908. Serial No. 456,351.

*To all whom it may concern:*

Be it known that I, ARTHUR G. SIMMONS, a citizen of the United States, residing at Boston, in the county of Suffolk and State of Massachusetts, have invented certain new and useful Improvements in Watering-Troughs, of which the following is a specification, reference being had therein to the accompanying drawings.

My invention relates to certain improvements in watering troughs whereby the trough is continually freed from scum and other foreign substances; whereby the sediment in the bottom of the trough is forced into the out-let pipe and the water kept clean and pure for horses and cattle, and to means for controlling the run-off of the scum, sediment, and other impure or foreign substances.

The invention consists in the combination of elements and in certain parts of novel construction entailed in the combination of said elements to obtain the desired result.

A full understanding of my invention can best be given by a detailed description of a preferred construction embodying the various features of my invention, and such a description will now be given in conjunction with the accompanying drawing, and I obtain my object by the mechanism there illustrated, showing such preferred construction, and the features forming the invention will then be specifically pointed out in the claims.

Figure 1:
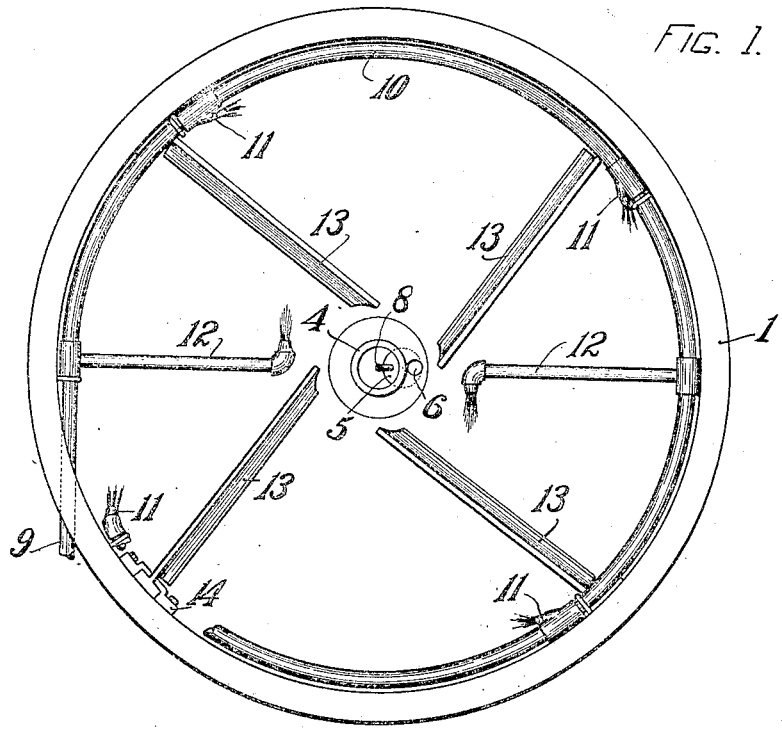
Figure 2:
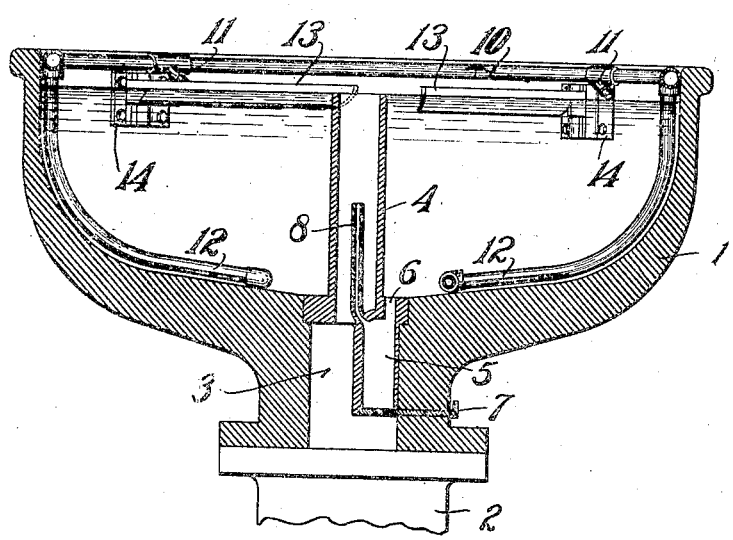

In the accompanying drawing, Figure 1 is a plan view of my apparatus. Fig. 2 is a central vertical section of the same.

Latitude is allowed herein as to details, as they may be changed or varied at will without departing from the spirit of my invention and the same yet remain intact and be protected.

Corresponding and like parts are referred to in the following description and indicated in all the views of the drawings by the same reference characters.

The tank or trough 1 is a cylindrical receptacle preferably of metal or stone and is supported and fastened in any desirable manner upon a standard 2 provided with the suitable piping (not shown) connecting with the passage 3 and allowing the scum, sediment, oily substances and over flow of water to run off. The trough is provided with a central piping 4 which extends vertically upward to the height desired for the level of the water and from which the overflow of water passes into the passage 3. The trough is provided with a passage 6 which extends downward into a receptacle or chamber 5 within the passage 3; this chamber being provided with an upward extending piping 8 within the central piping 4 through which the water flows from the chamber into the central piping. The passage 6 is preferably of a size large enough to admit all grain or other seeds and sediment settling in the bottom of the trough and passing it downward into the chamber 5, but the piping 8 is preferably of less diameter to limit the flow of water that passes through the passage 6. The chamber is provided with the lid or bottom plate 7 adapted to be pulled out when it is desired to free the chamber of the seeds of grain or other sediment that has passed into the chamber through the passage 6.

The water is supplied to the trough from the surface pipe through a piping 9 which extends into the side of the trough preferably on an incline and connects with the piping 10, which extends around the inner top side of the trough to a point about opposite the entrance of the piping 9. The trough is divided into a series of drinking spaces by arms 13 that are adjustably mounted in ways 14 on the inner side of the trough and these arms extend inward on an incline to a point one side of the center, and their upper portion 6 is preferably concaved. On the convexed side or rear of each of these arms a nozzle 11 extends from the piping 10 and throws a plurality of streams of water toward the concaved surface of the opposite arm to force the scum and other oily substances on the surface of the water in that section of the trough to this concaved surface of the arm so that it will be passed along by the arm and flow over and into the top of the central piping 4. From the piping 10 one or more pipings 12 extend downward into the lower portion of the trough and throw streams of water below the arms 13 and around the bottom of the trough to force the sediment, grains and other substances through the passage 6 into the chamber 5.

It is understood that my invention is not limited to the specific details of construction shown in the accompanying drawings, but that said details may be varied in the practical carrying out of my invention. It is also to be understood that the combinations specifically set forth in the several claims are intended to be separately claimed without limitation to the use in connection therewith of other features and details of construction illustrated.

Having thus described my invention, I claim as new and desire to secure by Letters Patent:—

1. A watering trough provided with a series of arms against which the flow of scum is directed and passed toward the center of the trough.

2. A watering trough provided with a series of inwardly extending arms for directing the flow of scum toward the center of the trough.

3. A watering trough provided with a series of inwardly extending arms having their upper surface concaved.

4. In a watering trough, a series of ways mounted on the inner side of the trough, and an arm adjustably mounted in each way and extending inwardly.

5. In a watering trough a series of arms dividing the trough into drinking spaces, and a piping adapted to throw water into each drinking space.

6. In a watering trough, means for throwing a plurality of streams of water into the trough above the water level and means for simultaneously throwing streams of water into the trough below the water level, substantially for the purposes shown and described.

7. In a watering trough, a central piping, a passage leading from the piping, a chamber within the passage and below the central piping having an inlet from the trough outside of the piping and an outlet within the central piping of smaller diameter than the inlet, and a bottom plate, substantially as shown.

8. In a watering trough, a central overflow piping, a chamber having an inlet from the bottom of the trough and an outlet into the piping, a series of ways, inclined arms adjustably mounted in the ways provided with concaved surfaces and a piping provided with a series of nozzles above the water level, and with a nozzle considerably below the water level, substantially as shown.

In testimony whereof I affix my signature in presence of two witnesses.

ARTHUR G. SIMMONS.

Witnesses:
CHARLES F. A. SMITH,
FRANKLIN S. FRISBIE.